No. 803,842. PATENTED NOV. 7, 1905.
E. MORRIS & C. RINAMAN.
WATER INLET VALVE FOR FLUSH TANKS.
APPLICATION FILED DEC. 17, 1904.
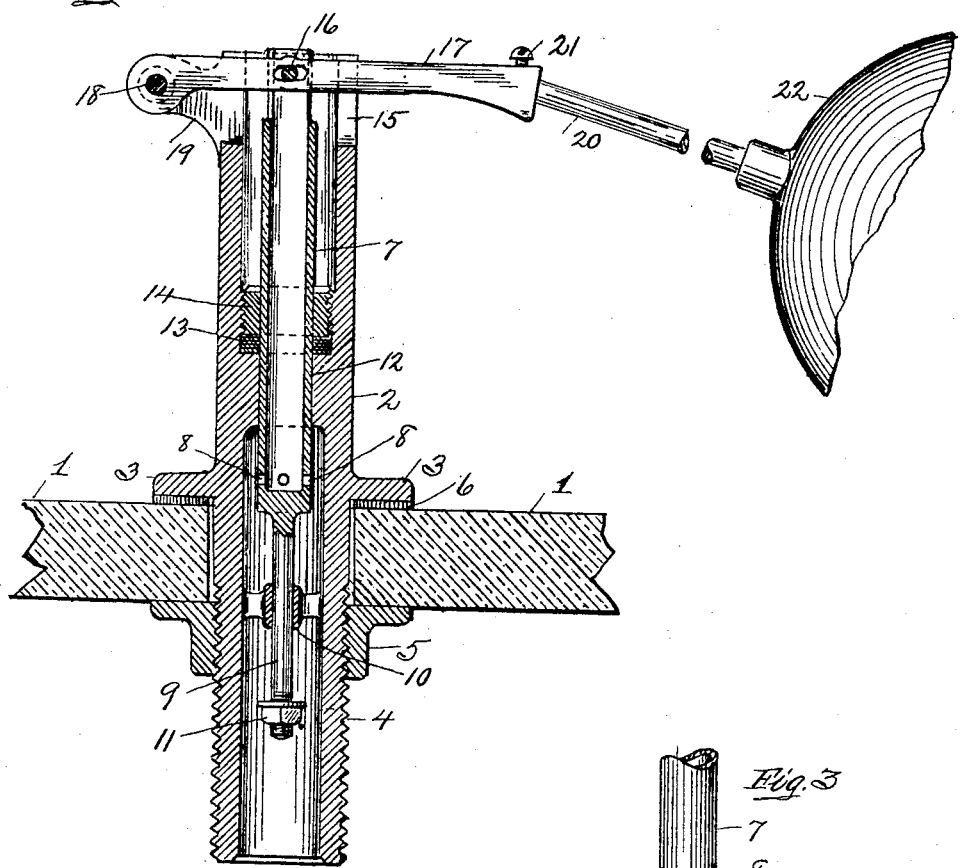
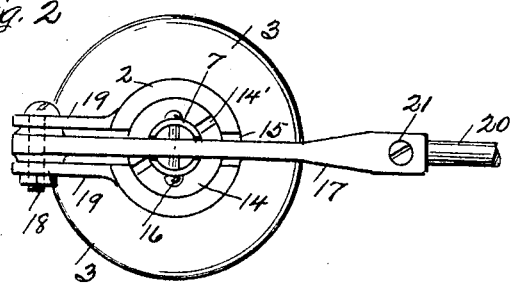
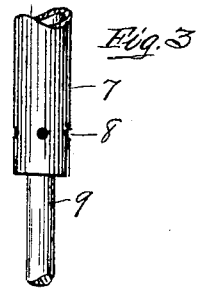
Witnesses:
J. A. Herron.
O. A. Hensel.
Inventors.
Emlyn Morris, and
Clarence Rinaman.
by their Atty. M. E. Harrison.

UNITED STATES PATENT OFFICE.

EMLYN MORRIS AND CLARENCE RINAMAN, OF PITTSBURG, PENNSYLVANIA.

WATER-INLET VALVE FOR FLUSH-TANKS.

No. 803,842.     Specification of Letters Patent.     Patented Nov. 7, 1905.

Application filed December 17, 1904. Serial No. 237,348.

*To all whom it may concern:*

Be it known that we, EMLYN MORRIS, residing at Pittsburg, and CLARENCE RINAMAN, residing at Hazlewood, Pittsburg, in the county of Allegheny, State of Pennsylvania, citizens of the United States, have invented certain new and useful Improvements in Water-Inlet Valves for Flush-Tanks; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improved inlet-valve for flush-tanks; and it consists in the certain details of construction and combination of parts, as will be fully described hereinafter.

In the accompanying drawings, Figure 1 is a central side sectional elevation of our improved inlet-valve for flush-tanks, the same being constructed and arranged in accordance with our invention. Fig. 2 is a plan view of the same. Fig. 3 is a side elevation of a portion of the inner tube, showing the water-inlets.

To put our invention into practice, and thereby provide a valve for regulating and controlling the flow of water into flush-tanks for water-closet purposes, we provide a cylindrical shell 2 of a suitable size and form of construction, the said shell being formed with an external flange 3 to rest upon the bottom 1 of the tank and with a screw-thread 4 at the base, upon which a flanged nut 5 is placed, which together with an intermediate washer 6 forms a water-tight connection with said tank. This shell 2 is formed with a central bore extending its entire length, contracted or reduced in diameter near the middle (12) and with an interior threaded portion to receive a gland 14 for the purpose of confining a packing 13, arranged about a central tube 7. This tube 7 is closed at the base and is formed with a downwardly-extending guide-piece 9, which passes through a bearing 10, integral with the shell 1, the said extension being provided with a screw-thread at its lower end, upon which is placed a nut 11 to act as a stop and limit the upward movement of the tube 7. This tube 7 is formed with a series of perforations 8 near its base and at the top is loosely connected, by means of a pin 16, to a horizontally-arranged lever 17, the said lever being pivoted (18) to lugs 19, formed with the shell 2, and operates in slots 15, formed in the top of the same. This lever 17 is provided at its free end with a socket and temper-screw 21 to connect with the rod 20 of a float 22 of ordinary construction.

In operation the water-supply pipe is connected to the threads 4 at the base of the shell 2 by the use of ordinary fittings. The water having left the tank 1 the float 22 will be in the position shown at Fig. 1 of the drawings, forcing the inner tube 7 downward, giving the water free access to the perforations 8, flowing through the same and up the tube and over the open mouth of the same into the tank. The level of the water in the tank will gradually lift the float 22, thereby carrying the tube 7 upward, and when the normal quantity of water is reached the perforations 8 will have moved into the contracted portion 12 of the shell, thereby closing the said perforations to shut off the water.

By the use of a valve constructed as described leakage is reduced to the minimum, the parts being simple, durable, and efficient and may be produced at small cost.

Various slight modifications and changes may be made in the details of construction without departing from the spirit of the invention. Therefore we do not wish to confine ourselves to the exact construction shown and described, but wish to claim all such as would come properly within the general scope of the invention.

Having thus described our invention, what we claim, and desire to secure by Letters Patent, is—

An automatic inlet-valve for flush-tanks, comprising the shell 2, having a longitudinal bore contracted or reduced to form a bearing 12, and provided with a second bearing 10 below, a means for attaching said shell to the tank and to the water-supply pipe, a centrally-arranged tube 7 and integral guide-bar 9, slidably mounted in said bearings, said tube being open at the top and having perforations at the base, an adjustable stop 11 on said guide-bar to limit and regulate the vertical movement of said tube, a packing 13 arranged about said tube, a threaded nut 14 to confine said packing, a lever 17 loosely connected to the top of the tube, said lever being fulcrumed at one end and provided with a float at the other, all arranged and combined for service, substantially as and for the purpose described.

In testimony whereof we affix our signatures in presence of two witnesses.

EMLYN MORRIS.
   CLARENCE RINAMAN.

Witnesses:
 C. C. LEE,
 O. A. HENSEL.